(12) United States Patent
Igarashi et al.

(10) Patent No.: US 6,345,842 B1
(45) Date of Patent: Feb. 12, 2002

(54) SHOCK ABSORBING TYPE STEERING APPARATUS AND A STRUCTURE FOR MOUNTING TO AN AUTOMOBILE BODY THE STEERING APPARATUS

(75) Inventors: Masaharu Igarashi; Sakae Matsumoto; Mitsuo Ichikawa, all of Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/429,703

(22) Filed: Oct. 29, 1999

(30) Foreign Application Priority Data

Oct. 30, 1998 (JP) .......................................... 10-309972

(51) Int. Cl.⁷ ................................................ B62D 1/18
(52) U.S. Cl. ........................ 280/775; 280/777; 280/779; 74/492
(58) Field of Search ................................ 280/777, 779, 280/775; 74/492

(56) References Cited

U.S. PATENT DOCUMENTS

| | | | | |
|---|---|---|---|---|
| 3,590,655 A | * | 7/1971 | Farrell et al. .................. | 74/492 |
| 3,621,732 A | * | 11/1971 | Kaniut ........................ | 74/492 |
| 3,707,096 A | * | 12/1972 | Bennett ....................... | 74/492 |
| 4,194,411 A | * | 3/1980 | Manabe et al. ................ | 74/492 |
| 4,273,005 A | * | 6/1981 | Strutt ......................... | 74/492 |
| 4,452,096 A | * | 6/1984 | Workman ..................... | 74/492 |
| 5,024,118 A | | 6/1991 | Khalifa et al. | |
| 5,228,720 A | * | 7/1993 | Sato et al. ................... | 280/777 |
| 5,356,179 A | * | 10/1994 | Hildebrandt et al. .......... | 280/777 |
| 5,580,314 A | * | 12/1996 | Moriyama et al. ........... | 464/162 |
| 5,640,884 A | * | 6/1997 | Fujiu et al. .................... | 74/492 |
| 5,802,926 A | * | 9/1998 | Thomas ....................... | 74/493 |
| 5,819,592 A | | 10/1998 | Lewandowski et al. | |
| 5,899,116 A | * | 5/1999 | Armstrong et al. ........... | 74/492 |
| 5,944,348 A | * | 8/1999 | Boyle, III et al. ........... | 280/777 |
| 6,026,704 A | * | 2/2000 | Shibata et al. ............... | 74/496 |
| 6,099,038 A | * | 8/2000 | Jurik et al. .................. | 280/777 |

FOREIGN PATENT DOCUMENTS

| | | |
|---|---|---|
| EP | 0 335 397 | 10/1989 |
| JP | 2-22383 | 6/1990 |
| JP | 4-41018 | 9/1992 |
| JP | 2000-6819 | 1/2000 |

* cited by examiner

Primary Examiner—Brian L. Johnson
Assistant Examiner—Deanna Draper
(74) Attorney, Agent, or Firm—Miles & Stockbridge P.C.

(57) ABSTRACT

A shock absorbing steering apparatus comprises a steering upper shaft fitted with a steering wheel, provided with a collapsible mechanism, a steering column for rotatably supporting the steering upper shaft therein, a first column bracket formed on the side of a front side end of the steering column and used for fixing a front portion of the steering column to a car body structural member, a second column bracket, formed on the side of a rear side end of the steering column and used for fixing a rear portion of the steering column to the car body structural member. A collapsible mechanism is provided, between the first and second column brackets, in the steering column and operating with the collapsing motion of the steering upper shaft. A guide plate is fixedly fitted to the fixed bracket in order to regulate an upward movement of the steering column when the movable bracket is released from the fixed bracket by dint of an impact force on the steering wheel and when a rear portion of the steering column moves forward.

19 Claims, 6 Drawing Sheets

SHOCK ABSORBING TYPE STEERING APPARATUS AND A STRUCTURE FOR MOUNTING TO AN AUTOMOBILE BODY THE STEERING APPARATUS

This application claims the benefit of Japanese Application No. 10-309972 which is hereby incorporated by reference.

BACKGROUND OF THE INVENTION

1. Field of the Invention

The present invention relates to a shock absorbing type steering apparatus and a structure for mounting to an automobile body the same steering apparatus and, more particularly, to a technology of smoothing collapses of a steering shaft and a steering column upon a collision.

2. Related Background Art

In the event of a collision of an automobile with another automobile or some sort of structure, a driver might secondarily collide against a steering wheel, with the result that the head and/or sternum would be seriously injured.

The automobiles manufactured over the recent years have broadly adopted a shock absorbing type steering apparatus in order to prevent such an injury. The shock absorbing type steering apparatus is structured so that the steering shaft on the side of the steering wheel collapses (shrinks in length) upon the secondary collision of the driver, wherein the steering shaft is separated into an outer shaft and an inner shaft which are slidably joined at mating serrated portions. Further, in the great majority of shock absorbing type steering apparatuses, the steering column is also separated into an outer column and an inner column which are slidably joined.

Normally, an impact energy absorbing mechanism (such as a slide resistance of the serrated portions meshing with each other) for resisting the collapse, is provided between the outer shaft and the inner shaft. The steering shaft, when an axial load exceeding a predetermined value acts thereon, collapses, and on this occasion an impact energy is absorbed by the impact energy absorbing mechanism. Note that in general an upper portion of the steering column comes off a car body structural member upon the secondary collision of the driver in order to make the steering upper shaft collapsible.

In addition, the steering apparatus of the automobile is operated (steered) by an unspecified multiplicity of drivers, and it is therefore desirable that a position of the steering wheel be adjustable corresponding to an individual physique and a driving posture. For meeting such a demand, not only the automobiles but also trucks adopt a large variety of tilt steering apparatuses each having a tilt mechanism. The tilt mechanism is a mechanism for adjusting the position of the steering wheel in an up-and-down direction, and is constructed of a tilt pivot serving as a center of rocking movement of the steering shaft and of the steering column, and a tilt adjusting mechanism for fixing the steering column in a desired position (at a desired angle).

The shock absorbing type steering apparatus having the tilt mechanism has a drawback in that the impact energy is not smoothly absorbed due to the rocking movement of the steering column when the secondary collision happens. For example, when the driver collides against the steering wheel, the steering column, after coming off a car body structural member such as a cross member, makes rocking movement about the tilt pivot. On this occasion, if the steering column largely moves upwards, a bending moment acts on the steering shaft and on the steering column pressed against the driver's body moving forwards, with the result that the steering upper shaft is more or less bent.

As a result, entry of the inner shaft into the outer column is impeded, and the steering upper shaft does not smoothly collapse. Then, it follows that an impact energy absorbing performance declines. Especially in an apparatus wherein the steering column is provided with a power assist mechanism constructed of an electric motor and a gear box etc, the bending moment caused in the steering column is increased by an inertia etc of the power assist mechanism, with the result that the shaft becomes much harder to collapse.

SUMMARY OF THE INVENTION

It is a primary object of the present invention, which was contrived to remedy the foregoing difficulties, to provide a shock absorbing type steering apparatus and a structure for mounting to an automobile body the same steering apparatus capable of attaining a smooth collapse of a steering shaft by regulating an upward movement of a steering column.

To accomplish the above object, according to a first aspect of the present invention, a shock absorbing type steering apparatus comprises a steering upper shaft, of which a rear side end is fitted with a steering wheel, provided with a collapsible mechanism, a steering column for rotatably supporting the steering upper shaft therein, a first column bracket formed on the side of a front side end of the steering column and used for fixing a front portion of the steering column to a car body structural member, a second column bracket, formed on the side of a rear side end of the steering column and used for fixing a rear portion of the steering column to the car body structural member, for permitting the rear portion of the steering column to be released forward from the car body structural member, and a collapsible mechanism provided between the first column bracket and the second column bracket in the steering column and operating with the collapsing motion of the steering upper shaft. A guide plate with which an upper surface of the steering column comes into contact, is fixedly fitted to the fixed bracket in order to regulate an upward movement of the steering column when the movable bracket is released from the fixed bracket by dint of an impact force on the steering wheel and when a rear portion of the steering column moves forward.

In the shock absorbing type steering apparatus according to the first aspect of the invention, even if an upward spring force acts on the steering wheel upon a secondary collision of a driver, the guide plate regulates an upward movement of the steering column, whereby there are almost no flexures or bends of the steering shaft and of the steering column, and the collapses of the steering shaft and the steering column are smoothed.

According to a second aspect of the present invention, in the shock absorbing type steering apparatus according to the first aspect, at least a contact portion of the guide plate with the steering column is composed of a low-friction material.

In this shock absorbing type steering apparatus according to the second aspect, a frictional resistance between the guide plate and the steering column decreases, and hence the steering column collapses more smoothly.

According to a third aspect of the present invention, in the shock absorbing type steering apparatus according to the first or second aspect, the steering column has a tilt mechanism, and the steering column comes into contact with the guide plate at an upper limit of a tilt adjusting range.

In the shock absorbing type steering apparatus according to the third aspect, the guide plate serves as a stopper when the steering column moves up to an upper limit of tilt adjustment, and, if the guide plate is composed of an elastic material, there is prevented a striking sound emitted when the guide plate impinges upon the steering column.

According to a fourth aspect of the present invention, there is provided a structure for mounting to an automobile body a shock absorbing type steering apparatus comprising a steering upper shaft, of which a rear side end is fitted with a steering wheel, provided with a collapsible mechanism, a steering column for rotatably supporting the steering upper shaft therein, the structure comprising a first column bracket formed on the side of a front side end of the steering column and used for fixing a front portion of the steering column to the automobile body structural member, a second column bracket, formed on the side of a rear side end of the steering column and used for fixing a rear portion of the steering column to the automobile body structural member, for permitting the rear portion of the steering column to be released forward from the automobile body structural member, and a collapsible mechanism provided between the first column bracket and the second column bracket in the steering column and operating with the collapsing motion of the steering upper shaft, wherein a guide plate with which an upper surface of the steering column comes into contact, is fixedly fitted to the automobile body structural member in order to regulate an upward movement of the steering column when the movable bracket is released from the fixed bracket by dint of an impact force on the steering wheel and when a rear portion of the steering column moves forward.

In the mounting structure according to the fourth aspect, even if the upward spring force acts on the steering wheel upon the secondary collision of the driver, the guide plate regulates the upward movement of the steering column, whereby there are almost no flexures or bends of the steering shaft and of the steering column, and the collapses of the steering shaft and the steering column are smoothed.

According to a fifth aspect of the present invention, in the mounting structure according to the fourth aspect, at least a contact portion of the guide plate with the steering column is composed of a low-friction material.

In the mounting structure according to the fifth aspect, the frictional resistance between the guide plate and the steering column decreases, and hence the steering column collapses more smoothly.

According to a sixth aspect of the present invention, in the mounting structure according to the fourth or fifth aspect, the steering column has a tilt mechanism, and the steering column comes into contact with the guide plate at an upper limit of a tilt adjusting range.

In the mounting structure according to the sixth aspect, the guide plate serves as the stopper when the steering column moves up to an upper limit of the tilt adjustment, and, if the guide plate is composed of the elastic material, there is prevented the striking sound emitted when the guide plate impinges upon the steering column.

DESCRIPTION OF THE PREFERRED EMBODIMENTS

Embodiments of the present invention will hereinafter be described with reference to the accompanying drawings.

Figure 1:
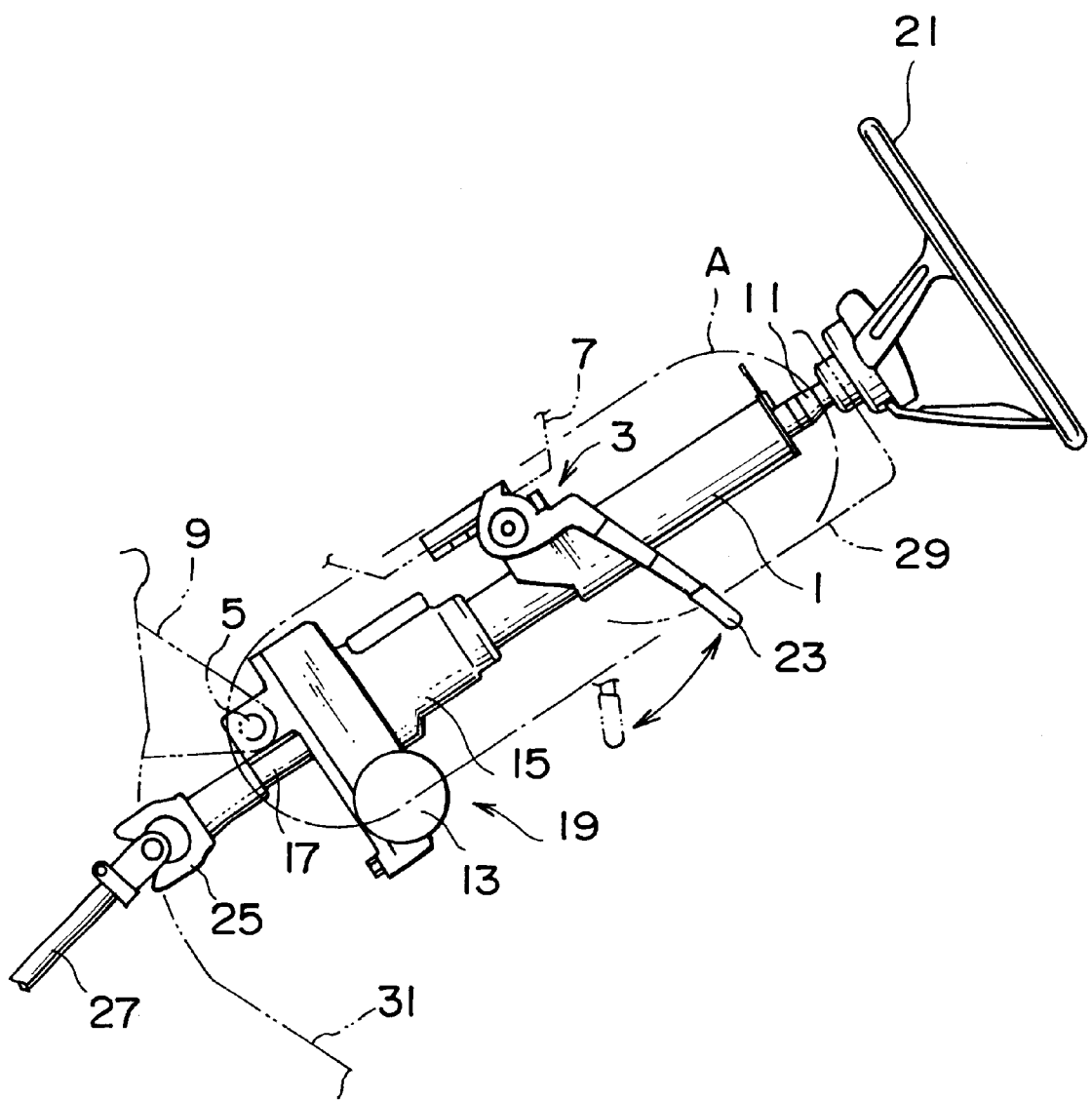
FIG. 1 is a side view of a steering apparatus in a first embodiment of the present invention.

FIG. 1 is a side view showing a portion, from the interior of a car, of a steering apparatus in a first embodiment, in which a steering column is designated by the reference numeral 1. The steering column is fixed to cross members 7, 9 categorized as car body structural members via a tilt mechanism 3 and a pivot pin 5. A steering upper shaft 11 is rotatably supported inside the steering column 1, and a power assist mechanism 19 constructed of an electric motor 13, a gear housing 15 and an output shaft 17 is integral with a lower portion of the steering column 1.

A steering wheel 21 is attached to a rear side end of the steering upper shaft 11, and, when a driver rotates the steering wheel 21, a rotational force thereof is increased by the power assist mechanism 19 and thus transferred to the output shaft 17. Referring to FIG. 1, a tilt lever 23 is an adjusting member of the tilt mechanism 3, and a lower steering shaft 27 is connected to a front side end of the steering upper shaft 11 through a universal joint 25. A column cover 29 covers the steering column 1, and a dashboard 31 is a section between the car interior and an engine compartment.

Figure 2:
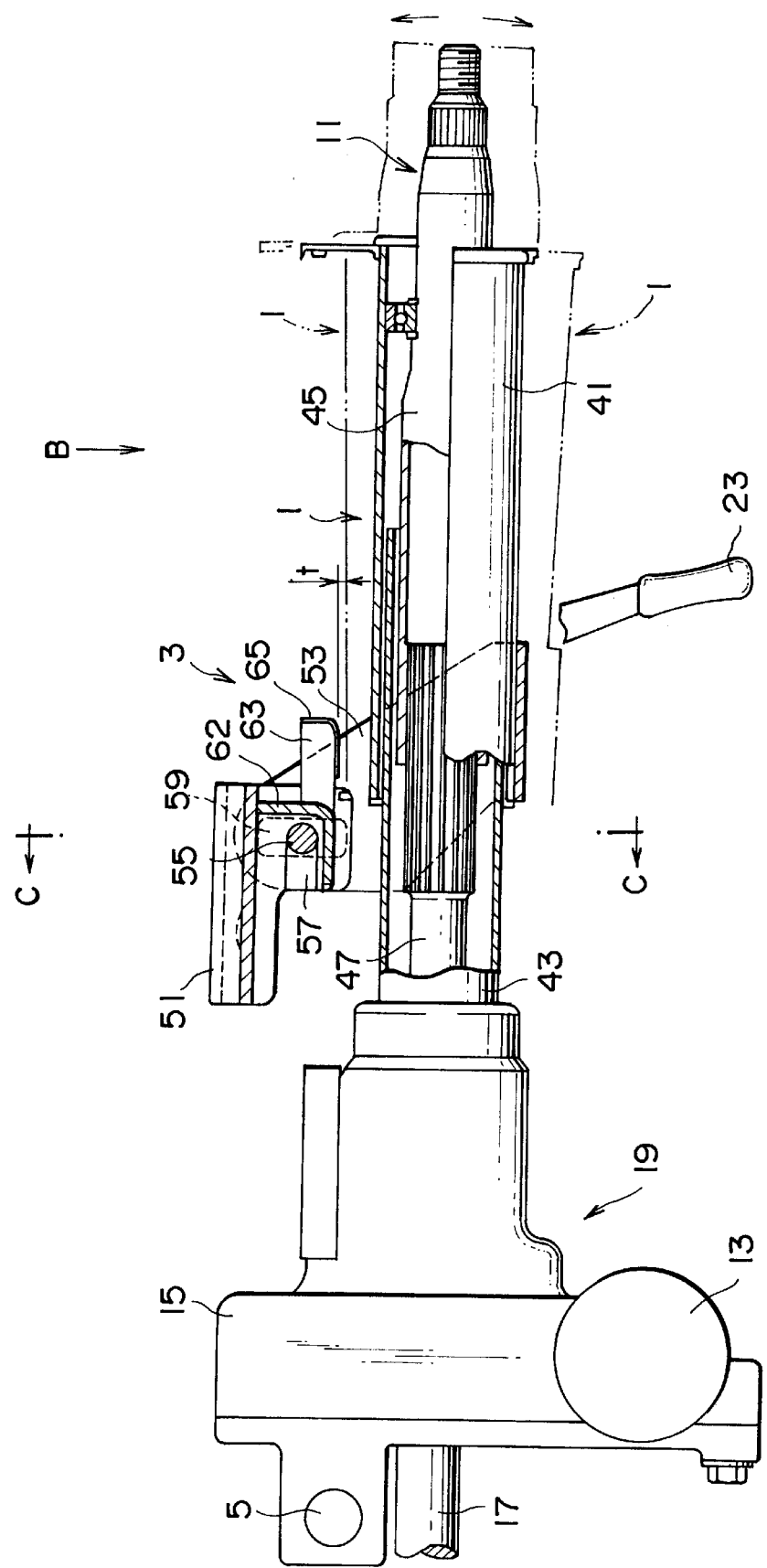
FIG. 2 is an enlarged sectional view of a portion A in FIG. 1.

FIG. 2 is an enlarged sectional view of a portion A in FIG. 1. As illustrated in FIG. 2, the steering column 1 is constructed of an outer column 41 on the side of the steering wheel 21, and an inner column 43 on the side of the power-assist mechanism 19, wherein the outer column 41 is slidably joined to the inner column 43. Further, the steering upper shaft 11 is constructed of an outer shaft 45 on the side of the steering wheel 21 and an inner shaft 47 on the side of the power assist mechanism 19, wherein the serrated outer shaft 45 meshes with the serrated inner shaft 47. In this embodiment, with respect to the steering upper shaft 11, the serrated outer shaft 45 comparatively tightly meshes with the serrated inner shaft 47, thereby forming a shock absorbing mechanism for absorbing a shock energy when collapsed.

Figure 3:
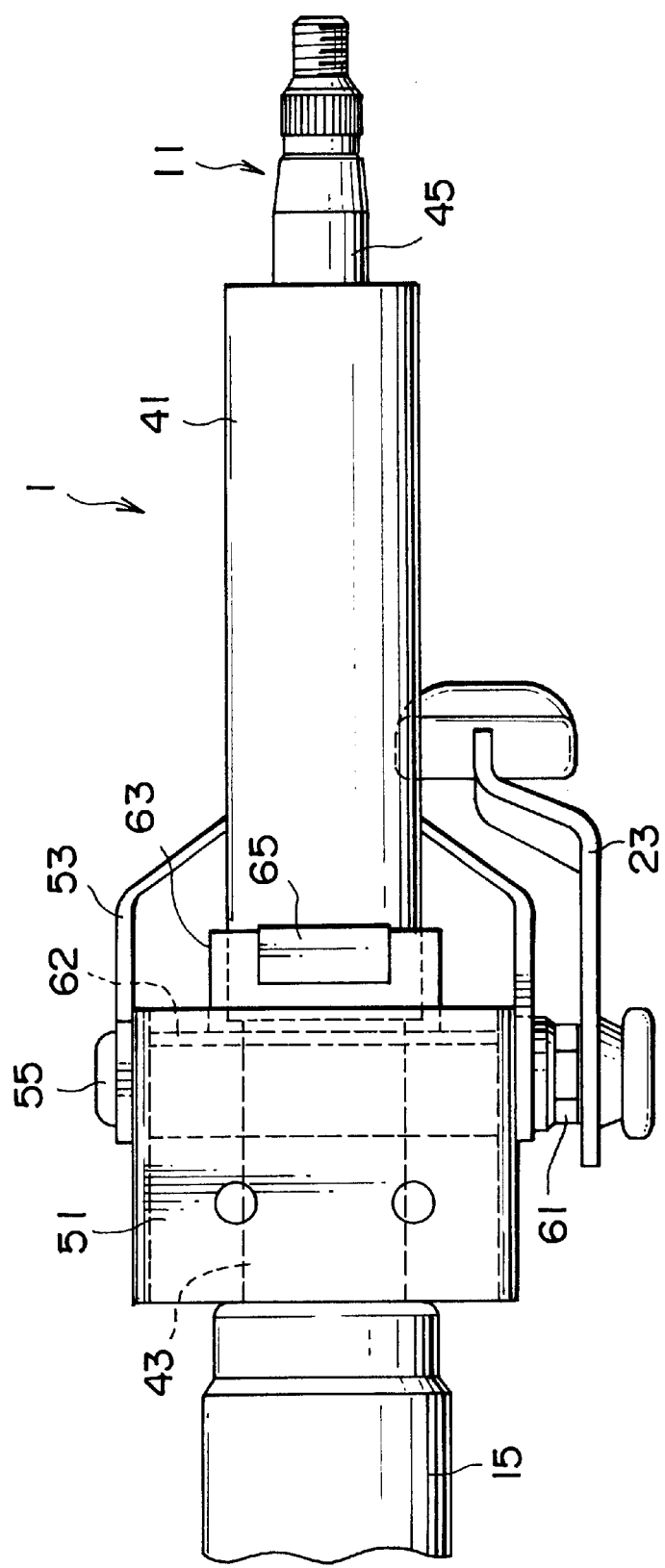
FIG. 3 is a view taken along the arrowhead line B in FIG. 2.
Figure 4:
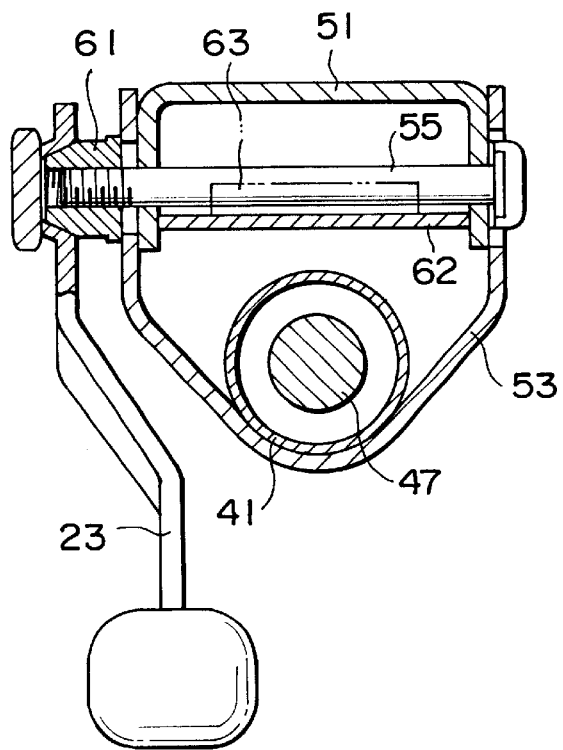
FIG. 4 is a sectional view taken along the line C—C in FIG. 2.

FIG. 3 is a view taken along the arrowhead B in FIG. 2. FIG. 4 is a sectional view taken along the line C—C in FIG. 2. As shown in FIGS. 3 and 4, the tilt mechanism 3 has, as principal structural members, a fixed bracket 51 taking a U-shape and fixed to the cross member 7, a movable bracket 53 integrally welded to the steering column (the outer column 41) in such a manner as to embrace the fixed bracket 51, and a tilt bolt 55 penetrating both of the brackets 51, 53. A side surface of the fixed bracket 51 is formed with a U-shaped bolt holding groove 57 opened on its front side, and a side surface of the movable bracket 53 is formed with an elongate hole 59 in the shape of a circular arc with a pivot pin 5 being the centered thereof. The tilt bolt 55 is fitted into the bolt holding groove 57 and the elongate hole 59. The tilt bolt 55 meshes with a nut 61 integral with or separable from the tilt lever 23. A driver operates the tilt lever 23, whereby the movable bracket 53 (i.e., the steering column 1) is fixed to or released from the fixed bracket 51.

A stiffener plate 62 taking an L-shape in section is integrally welded to an inner side surface of the fixed bracket 51, and a guide plate 63 assuming a rectangular shape in section and directed backward is integrally welded to a rear surface of the stiffener plate 62. The guide plate 63 faces at a predetermined spacing t an upper surface of the steering column 1 at an upper limit position of a tilt operation range of the steering column 1. Further, a slip sheet 65 composed of a low-friction material (e.g., a synthetic resin such as PTFE etc) is stuck to the rear portion of the guide plate, extending from its lower surface to its upper surface.

An operation of the first embodiment will hereinafter be described.

Figure 5:
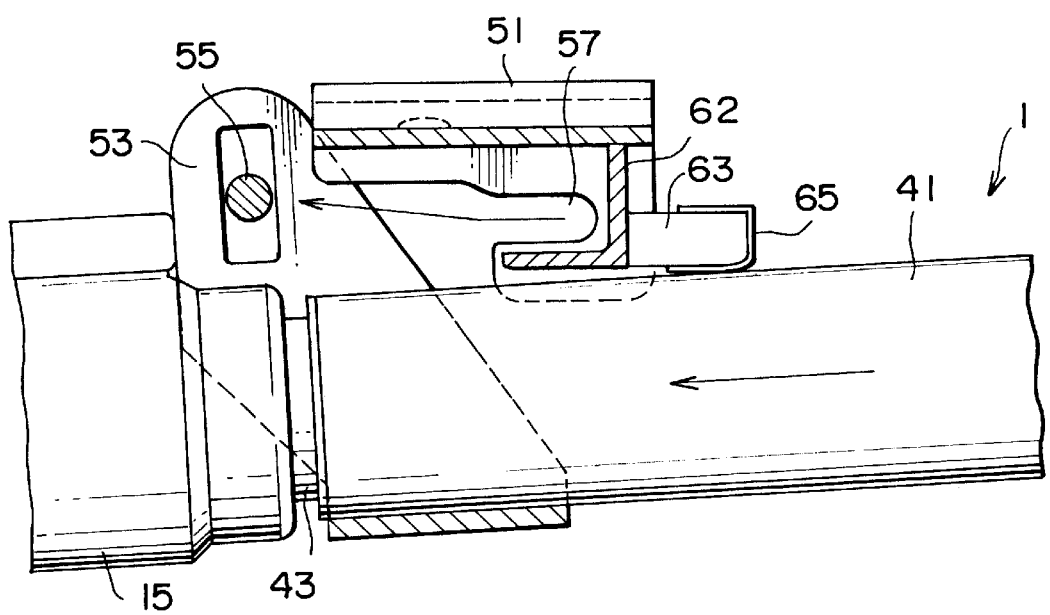
FIG. 5 is an explanatory view showing an operation of the first embodiment.

When the driver secondarily collides against the steering wheel 21 subsequent to a collision of the vehicle, a forward load acts on the steering shaft 11 and on the steering column 1. If this load exceeds a predetermined value, the inner shaft 47 enters the outer shaft 45, and the steering upper shaft 11 collapses. Further, when the outer column 41 advances by a predetermined distance as shown in FIG. 5, the tilt bolt 55 moves forward off the bolt holding groove 57, and the movable bracket 53 (the steering column 1) comes off the fixed bracket 51 and thereby becomes rockable about the pivot pin 5. When this happens, a force causing an upward spring due to the collision of the driver acts upon the steering column 1 because of its being disposed with a tilt to the driver.

In the first embodiment, however, when the steering column 1 moves upward by a slight distance, an upper surface of the steering column 1 is brought into contact with the lower surface of the guide plate 63, and the steering column I engages therewith at a predetermined angle. A bending moment acting on the steering upper shaft 11 thereby becomes very small, and the collapse thereof is smoothly carried out. Note that the steering column 1 comes into contact with the guide plate 63 through the slip sheet 65 exhibiting a small coefficient of friction, and therefore slides on the guide plate 63 in a state of having almost no frictional resistance.

Figure 6:
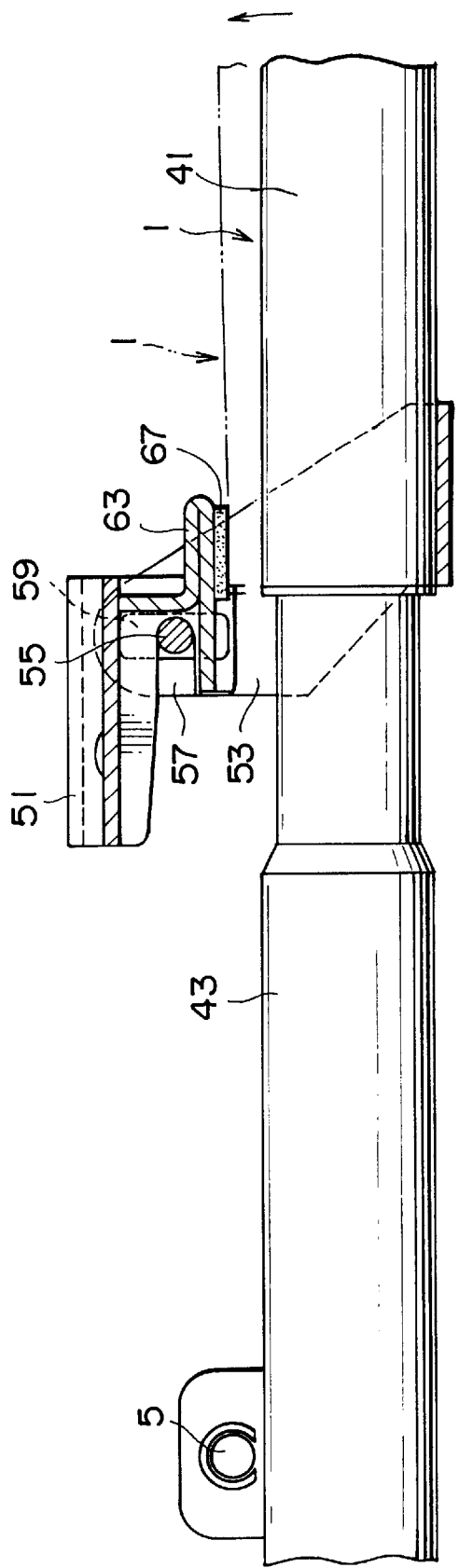
FIG. 6 is a sectional view showing the principal components of the steering apparatus in a second embodiment of the present invention.

FIG. 6 is a sectional view showing the principal components of the steering apparatus in a second embodiment of the present invention. The steering apparatus in the second embodiment takes substantially the same structure as that in the first embodiment except that the power assist mechanism is not provided, and there is a difference in configuration of the guide plate 63. To be more specific, the guide plate 63 is formed by steel sheet press molded in a T-shape in section, and serves as a stiffener plate, and a stopper plate 67 is composed of an elastic material (a synthetic resin such as PP etc in the second embodiment) is stuck to a lower surface of the guide plate 63. The stopper plate 67 comes into (elastic) contact with the upper surface of the steering column 1 at the upper limit position of the tilt operation range of the steering column 1.

An operation of the second embodiment will hereinafter be explained.

In the second embodiment also, when the steering column 1 collapses upon the secondary collision of the driver, and moves upward by a slight distance, the upper surface of the steering column 1 comes into contact with the lower surface of the stopper plate 67, whereby the steering column 1 engages therewith at a predetermined angle (an upper limit position of the tilt operation range). The stopper plate 67 is manufactured by use of a synthetic resin exhibiting lubricity, and hence, as in the first embodiment, the steering column 1 smoothly slides thereon. In the second embodiment, the stopper plate 67 is composed of the elastic material, thereby absorbing an impact when the steering column 1 moves to an upper end when making a tilt adjustment and also preventing both a metal striking sound due to an impingement of the tilt bolt 55 upon the movable bracket 53 and deformations of the impinging portions thereof.

Figure 7:
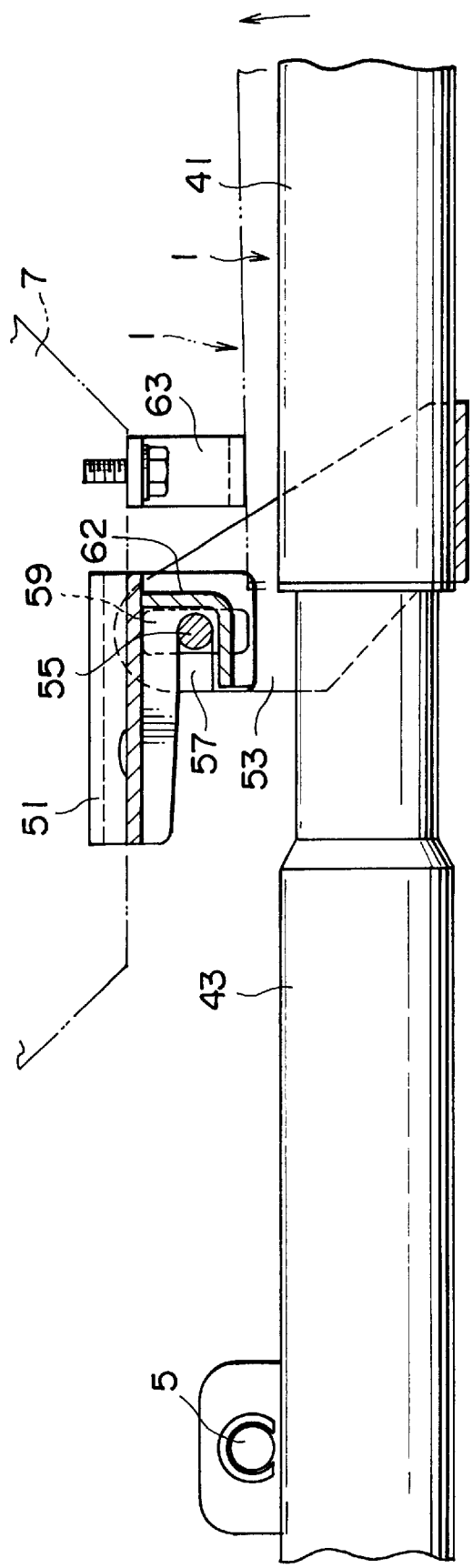
FIG. 7 is a side view showing the principal components of the steering apparatus of the present invention, together with structural components of an automobile to which said apparatus may be fixed.

The present invention is not limited to the embodiments discussed above. For example, in the embodiments described above, the low-friction material and the elastic material are stuck to the guide plate but are not necessarily required. Further, in accordance with the embodiments discussed above, the guide plate 63 is fixedly attached to or molded integrally with the stiffener plate 62 defined as a structural member of the steering apparatus. As illustrated in FIG. 7, however, the guide plate 63 may also be fixedly attached (such as fastened by a bolt) to a car body structural member such as the cross member 7 etc. Moreover, in each of the embodiments discussed above, the present invention is applied to a shock absorbing type steering apparatus including a tilt mechanism but may also be applied to those that do not include the tilt mechanism. Further, the collapsible mechanism provided in the steering upper shaft may involve, instead to the serration type exemplified in the embodiment, a mesh type or a ball type etc. The specific construction of the tilt mechanism and the specific configurations of the steering shaft and of the steering column etc, may properly be modified within the scope of the present invention without departing from the gist of the present invention.

As discussed above, the shock absorbing type steering apparatus according to the present invention is constructed of the steering upper shaft, of which the rear side end is fitted with the steering wheel, provided with the collapsible mechanism, the steering column for rotatably supporting the steering upper shaft therein, the first column bracket formed on the side of the front side end of the steering column and used for fixing the front portion of the steering column to the car body structural member, the second column bracket, formed on the side of the rear side end of the steering column and used for fixing the rear portion of the steering column to the car body structural member, for permitting the rear portion of the steering column to be released forward from the car body structural member, and the collapsible mechanism provided, between the first column bracket and the second column bracket, in the steering column and operating with the collapsing motion of the steering upper shaft. In the thus constructed shock absorbing type steering apparatus and in the automobile having the same steering apparatus, the guide plate with which the upper surface of the steering column comes into contact is fixedly fitted to the fixed bracket or the car body structural member in order to regulate the upward movement of the steering column when the movable bracket is released from the fixed bracket by dint of the impact force on the steering wheel and when the rear portion of the steering column moves forward. With this invention, even when the upward spring force acts on the steering wheel due to the secondary collision of the driver, the guide plate regulates the upward rocking movement of the steering column, whereby there are almost no flexures or bends of the steering shaft and of the steering column, and the collapses of the steering shaft and the steering column are smoothed.

What is claimed is:

1. A shock absorbing steering apparatus, comprising:

a steering upper shaft, of which a rear side end is fitted with a steering wheel;

a steering column having said steering upper shaft rotatably supported therein;

a first column bracket disposed toward a front side end of said steering column and used for fixing a front portion of said steering column to a vehicle body structural portion;

a second column bracket disposed toward a rear side end of said steering column and used for fixing a rear portion of said steering column to said structural portion, and permitting a rear portion of said steering column to be released from said structural portion for forward movement, said second column bracket comprising a fixed bracket fixed to said structural portion and a movable bracket fixed to said steering column and releasably joined to said fixed bracket; and a collapsible mechanism provided between said first column bracket and said movable bracket in said steering column and operating with a collapsing motion of said steering upper shaft, wherein said fixed bracket includes a guide member fixedly provided thereon, said guide member being disposed toward a rear of said fixed bracket and having a portion positioned below a top of said fixed bracket and above said steering column to regulate an upward movement of said steering column by contact therewith when said movable bracket is released from said fixed bracket by dint of an impact force on said steering wheel causing a rear portion of said steering column to move forward, and wherein said guide member is disposed on a rear surface of said fixed bracket, and said rear surface is a rear surface of a stiffener plate of said fixed bracket.

2. A shock absorbing type steering apparatus according to claim 1, wherein at least a contact portion of said guide member with said steering column is composed of a low-friction material.

3. A shock absorbing type steering apparatus according to claim 1, wherein said steering column has a tilt mechanism, and said steering column comes into contact with said guide member at an upper limit of a tilt adjusting range.

4. An apparatus according to claim 1, wherein said guide member extends rearward a predetermined length from said rear of said fixed bracket.

5. A shock absorbing steering apparatus, comprising:

a steering upper shaft, of which a rear side end is fitted with a steering wheel;

a steering column having said steering upper shaft rotatably supported therein;

a first column bracket disposed toward a front side end of said steering column and used for fixing a front portion of said steering column to a vehicle body structural portion;

a second column bracket disposed toward a rear side end of said steering column and used for fixing a rear portion of said steering column to said structural portion, and permitting a rear portion of said steering column to be released from said structural portion for forward movement, said second column bracket comprising a fixed bracket fixed to said structural portion and a movable bracket fixed to said steering column and releasably joined to said fixed bracket; and a collapsible mechanism provided between said first column bracket and said movable bracket in said steering column and operating with a collapsing motion of said steering upper shaft, wherein said fixed bracket includes a guide member fixedly provided thereon, said guide member being disposed toward a rear of said fixed bracket and having a portion positioned below a top of said fixed bracket and above said steering column to regulate an upward movement of said steering column by contact therewith when said movable bracket is released from said fixed bracket by dint of an impact force on said steering wheel causing a rear portion of said steering column to move forward, and wherein said guide member and a stiffener plate of said fixed bracket are constituted by portions of a unitary plate member.

6. An apparatus according to claim 5, wherein said guide member extends rearward a predetermined length from said rear of said fixed bracket.

7. A shock absorbing type steering apparatus according to claim 6, wherein at least a contact portion of said guide member with said steering column is composed of a low-friction material.

8. A shock absorbing type steering apparatus according to claim 6, wherein said steering column has a tilt mechanism, and said steering column comes into contact with said guide member at an upper limit of a tilt adjusting range.

9. A shock absorbing steering apparatus, comprising:

a steering upper shaft, of which a rear side end is fitted with a steering wheel;

a steering lower shaft coupled to a front end portion of the steering upper shaft to be rotatable by rotation of said steering upper shaft and movable relative to said steering upper shaft in an axial direction upon an impact of a secondary collision;

a steering column assembly including an upper column and a lower column connected to each other for relative movement in the axial direction upon impact of the secondary collision, the upper and lower columns respectively having said steering upper and lower shafts rotatably supported therein, said steering column assembly having a front end portion supported rotatably by a tilt pivot to a vehicle body structural portion to make a tilt position of the steering column assembly adjustable;

a fixed column bracket fixed to the vehicle body structural portion and supporting a front portion of said upper column to said structural portion;

a movable column bracket fixed to said upper column and supporting said upper column to said structural portion through said fixed bracket, said movable bracket being releasably joined to said fixed bracket so as to be forwardly movable relative to said fixed bracket upon a secondary collision; and an impact absorbing mechanism arranged to absorb an impact energy of the secondary collision when said movable bracket is moved forward relative to said fixed bracket; wherein said fixed bracket is fixedly provided at a rear position thereof with a guide member extended rearward by a predetermined length, so that when said steering column assembly is rotated about said tilt pivot and moved upward upon the secondary collision, said upper column is brought into contact with said guide member, thereby reducing a bending moment of said steering column assembly.

10. An apparatus according to claim 9, wherein said guide member is disposed on a rear surface of said fixed bracket.

11. An apparatus according to claim 10, wherein said rear surface is a rear surface of a stiffener plate of said fixed bracket.

12. An apparatus according to claim 9, wherein said guide member and a stiffener plate of said fixed bracket are constituted by portions of a unitary plate member.

13. A shock absorbing type steering apparatus, comprising:
   a steering upper shaft, of which a rear side end is fitted with a steering wheel;
   a steering lower shaft coupled to a front end portion of the steering upper shaft to be rotatable by rotation of said steering upper shaft and movable relative to said steering upper shaft in an axial direction upon an impact of a secondary collision;
   a steering column assembly including an upper column and a lower column connected to each other for relative movement in the axial direction upon impact of the secondary collision, the upper and lower columns respectively having said steering upper and lower shafts rotatably supported therein, said steering column assembly having a front end portion supported rotatably by a tilt pivot to a vehicle body structural portion to make a tilt position of the steering column assembly adjustable;
   a fixed column bracket fixed to the vehicle body structural portion and supporting a front portion of said upper column to said structural portion;
   a movable column bracket fixed to said upper column and supporting said upper column to said structural portion through said fixed bracket, said movable bracket being releasably joined to said fixed bracket so as to be forwardly movable relative to said fixed bracket upon a secondary collision; and
   an impact absorbing mechanism arranged to absorb an impact energy of the secondary collision when said movable bracket is moved forward relative to said fixed bracket; and
   a guide member independent of said fixed bracket and fixedly attached to said structural portion, with a portion of said guide member positioned below a top of said fixed bracket and above said steering column, so that when said steering column assembly is rotated about said tilt pivot and moved upward upon the secondary collision, said upper column is brought into contact with said guide member, thereby reducing a bending moment of said steering column assembly.

14. An apparatus according to claim 13, wherein at least a contact portion of said guide member with said upper column is composed of a low-friction material.

15. An apparatus according to claim 13, wherein said upper column comes into contact with said guide member at an upper limit of a tilt adjusting range.

16. A support structure for a shock absorbing steering apparatus including a steering upper shaft, of which a rear side end is fitted with a steering wheel, and a steering column having said steering upper shaft rotatably supported therein, said support structure comprising:
   a fixable column bracket used for fixing a portion of said steering column to a vehicle body structural portion;
   a movable column bracket fixed to said steering column to be releasably joined to said fixable bracket to support said steering column to said structural portion through said fixable bracket and to permit said steering column to be released for forward movement relative to said fixable bracket upon an impact of a secondary collision; and
   a guide member to be fixedly attached to said vehicle body structural portion, with a portion of said guide member being positioned below a top of said fixed bracket and above said steering column to regulate an upward movement of said steering column by contact therewith when said movable bracket is released from said fixable bracket by dint of an impact force on said steering wheel causing a rear portion of said steering column to move forward,
   wherein said steering column has a tilt mechanism and comes into contact with said guide member at an upper limit of a tilt adjusting range.

17. A support structure according to claim 16, wherein at least a contact portion of said guide member with said steering column is composed of a low-friction material.

18. A support structure according to claim 16, wherein said guide member is fixedly provided on said fixable bracket.

19. A support structure according to claim 16, wherein said guide member is independent of said fixable bracket.

* * * * *